May 6, 1930.                    M. C. TERRY                    1,757,602

CONTROL DEVICE

Filed Sept. 8, 1924

WITNESS

M.C. Terry
INVENTOR

BY

ATTORNEY

Patented May 6, 1930

1,757,602

UNITED STATES PATENT OFFICE

MATSON C. TERRY, OF PHILADELPHIA, PENNSYLVANIA, ASSIGNOR TO WESTINGHOUSE ELECTRIC & MANUFACTURING COMPANY, A CORPORATION OF PENNSYLVANIA

CONTROL DEVICE

Application filed September 8, 1924. Serial No. 736,658.

My invention relates to control devices, particularly to switches for controlling the flow of current through an electrical circuit and it has for an object to provide apparatus of the character designated which shall operate reliably and automatically and which shall include time responsive means for closing the circuit and thermostatic means for re-opening the circuit. A further object of my invention is to provide an improved method of operating an energy-consuming device so as to secure the advantage of relatively low power rates.

Figure 1:
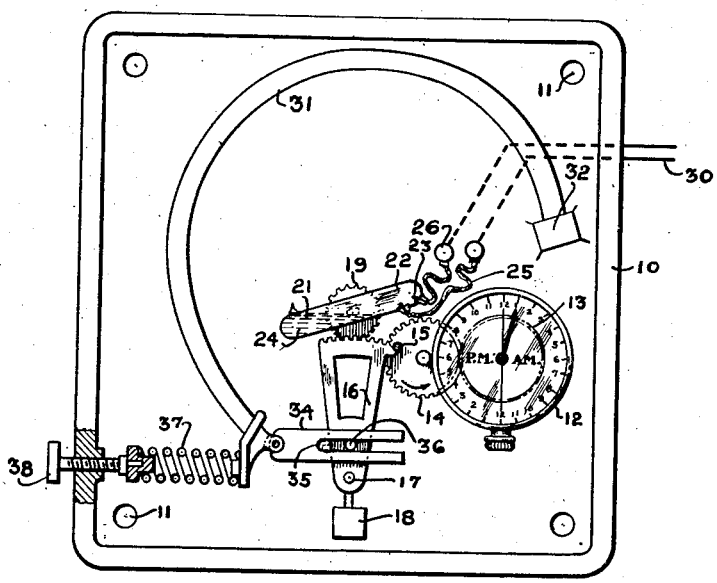
Figures 2, 3:
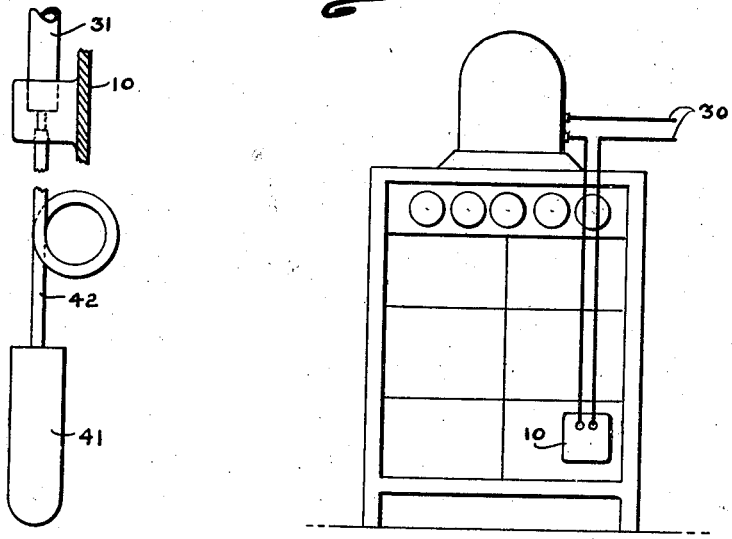

These and other objects, which will be made apparent throughout the further description of the invention, may be attained by the employment of apparatus hereinafter described and illustrated in the accompanying drawing in which Fig. 1 is a plan view of one form of my device; Fig. 2 is a partial view in elevation of another embodiment of my device, and Fig. 3 is a view showing the installation of my control device in a mechanical refrigerator.

It is generally well known that most electric light and power loads fluctuate considerably during the course of each day. As sufficient generating capacity must be provided by public service companies to adequately handle the maximum or relatively short periods of peak loads, a considerable portion of the apparatus remains normally inactive during the greater portion of each day. Thus, the demands for service are generally at a minimum between the hours of 1:00 a. m. and 6:00 a. m. This invention therefore provides an automatic control device for intermittently operated electrical appliances, such as household refrigerators, which shall confine their periods of activity to such times as the demand for electrical service is relatively low, thereby utilizing a portion of the power plant apparatus which is normally inactive, and effecting a considerable economy in the generating cost of electrical energy, with consequent ability to give a lower rate to the power customer.

Accordingly, I have provided a control device which employs a clock mechanism for closing the circuit at any desired time. Should the device be associated with a refrigerating machine, the circuit remains closed until such time as a predetermined temperature has been reached in the refrigerator box, whereupon the thermostatic device breaks the circuit. The device may be so designed that the circuit is closed at the desired time, for example, 1:00 a. m., irrespective of the temperature prevailing within the refrigerator box. The length of the operating cycle is dependent upon the temperature prevailing within the box at the time the circuit is closed, refrigerating machines of this character frequently being so designed that the amount of heat absorbed during each operating cycle is always sufficient to maintain the refrigerator box below a predetermined maximum temperature throughout the ensuing day.

Referring to the drawing for a more detailed description of my invention, I show in Fig. 1 a base 10 provided with holes 11 for suitable supporting screws. Secured to the base 10 is a clock mechanism 12 provided with a single hand or pointed, one revolution of which is equivalent to one day or twenty-four hours. The clock mechanism 12 drives gears 13 and 14, the latter having provided near its periphery a pin 15. As the gear 14 revolves in the direction indicated, the pin 15 moves a segmental gear 16 in one direction about its axis 17, the segmental gear being provided with a counter-weight 18 for balancing purposes. The segmental gear 16 meshes with a pinion 19 which is rotatably secured to a tilting contact device 21 comprising a receptacle 22, contacts 23 and a quantity of mercury 24. The contacts 23 are connected by flexible wiring 25 to binding posts 26 which in turn are connected to one side of an electrical circuit 30. A Bourdon tube 31 is rigidly secured at its one end to the base 10 by means of a boss 32. The tube is sealed at both ends and contains a quantity of expansible or volatile fluid. The free end of the tube 31 is pivotally connected to a link 34 which is designed to engage at one end 35, or, in one direction only, a pin 36 which is provided on the segmental gear 16. A spring 37, which is installed under compression, and an adjusting screw 38 are provided in order that the temperature required to open the circuit may be altered within predetermined limits.

The operation of this embodiment of my invention is as follows: Should the time desired to close the circuit be 1:00 a. m., the gears 13 and 14 associated with the clock mechanism 12 are so arranged that the pin 15 engages the segmental gear 16 at the desired hour. The movement of the gear 14 causes the segmental gear 16 to rotate the pinion 19, thereby tilting the receptacle 22. The mercury then flows to the opposite end of the receptacle and forms a conducting connection between the contacts 23—23, thereby closing the circuit 30 and energizing any electrical appliance which may be associated therewith.

If the control device is associated with a mechanical refrigerator, such as illustrated in Fig. 3, the operation of the refrigerating mechanism reduces the temperature within the refrigerator box and incidentally lowers the pressure of the gas within the Bourdon tube 31. As a result, the radius of curvature of the tube is reduced until eventually the end 35 of the link 34 engages the pin 36, causing the segmental gear 16 to tilt the receptacle 22 to break the circuit. As may be readily understood from the above description, the clock mechanism is only effective for closing the circuit and the Bourdon tube only for opening the circuit. Subsequent to the breaking of the circuit, any increase in the temperature of the surrounding medium effects a partial vaporization of the fluid in the Bourdon tube, the resulting increase in pressure creating a tendency for the tube to assume a greater radius of curvature. However, the construction is such that the latter movement is ineffective to cause any change in the setting of the tilting contact.

While I have described my invention as being operative but once each day, it is to be understood that it may be readily adapted to effect any desired number of contacts in a stipulated time. Furthermore, while the clock mechanism is employed to close the circuit and the Bourdon tube to open the circuit, this arrangement may be reversed. The embodiment illustrated in Fig. 1 is especially adapted for use where the electrical circuit is to be controlled in response to the temperature of the medium surrounding the control device. In this arrangement, the expansible fluid is provided solely within the Bourdon tube, the latter being sealed at both ends.

The embodiment illustrated in Fig. 2, however, is adapted for use where the control is to be remotely disposed from the controlled medium and comprises a bulb 41 containing an expansible fluid and connected through a capillary conduit 42 with the Bourdon tube 31, no portion of the apparatus but the bulb 41 being exposed to the temperature of the medium to be controlled.

While I have described my device as being especially adapted for automatically controlling the operation of mechanical refrigerators, it is to be understood that its use is not confined solely thereto and that it may be utilized in various ways such as for controlling the filling of water or oil storage tanks, compressed air reservoirs, etc.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. Controlling means for an electrical circuit comprising a movable contact mechanism connected in the circuit, an expansive member effective to positively actuate the contact mechanism in one direction only and a chronometric device effective to positively actuate the contact mechanism in the opposite direction only.

2. Controlling means for an electrical circuit comprising a movable contact member connected in the circuit, a flexible member responsive to temperature and effective to positively actuate the contact member in one direction only, and a chronometric device for positively actuating the contact member in the opposite direction only.

3. Controlling means for an electrical circuit comprising a tilting contact device disposed in the circuit, mechanism for actuating said tilting contact device, a Bourdon tube containing an expansible fluid and having a one-way motion transmitting connection with the mechanism for tilting the contact device in one direction, and a clock mechanism for tilting the contact device in the opposite direction only at predetermined periods of time.

4. Controlling means for an electrical circuit comprising a hermetically sealed member containing an expansible fluid and subject to changes in temperature, a movable contact member connected in the circuit, one-way motion transmitting means for transmitting the movements of the hermetically sealed member to the movable contact member for actuating the same in one direction, and a chronometric device adapted to actuate the contact member in the opposite direction only.

5. Controlling means for an electrical circuit comprising a single switch for the circuit, a mechanism movable in one direction to close the switch, time controlled means for positively actuating said mechanism to operate in the direction only for closing the switch, temperature responsive means, and one-way motion transmitting means between the temperature responsive means and the mechanism for causing said mechanism to operate to open the switch.

6. Controlling means for an electric circuit comprising a tilting switch for opening and closing the circuit, a pivoted member operatively connected to the tilting switch for actuating said switch, a chronometric device, means cooperating between the chronometric device and the pivoted member for moving the latter in a direction for closing the circuit at predetermined periods of time, means movable in response to temperature changes, and mechanism connected to said last mentioned means effective to transmit motion to the pivoted member only in a direction for opening the circuit.

In testimony whereof, I have hereunto subscribed my name this 24th day of July, 1924.

MATSON C. TERRY.